United States Patent [19]

Bruce et al.

[11] 4,039,951
[45] Aug. 2, 1977

[54] METHOD AND APPARATUS FOR DIGITALLY CONTROLLING AN AMPLITUDE MODULATED PULSE ENVELOPE ON AN RF SIGNAL

[75] Inventors: Robert L. Bruce; Neil A. Gaughan; Allan E. Ripingill, all of San Diego, Calif.

[73] Assignee: Cubic Industrial Corporation, San Diego, Calif.

[21] Appl. No.: 560,338

[22] Filed: Mar. 21, 1975

[51] Int. Cl.² .............................................. H04B 1/00
[52] U.S. Cl. .................................... 325/38 R; 328/14; 332/37 D; 235/197
[58] Field of Search .................... 332/37 R, 37 D, 18; 375/38 R; 235/197; 328/14; 343/5 DP; 340/347 DA

[56] References Cited

U.S. PATENT DOCUMENTS

| | | | |
|---|---|---|---|
| 2,764,738 | 9/1956 | Bush | 332/18 |
| 3,035,234 | 5/1962 | Hillman | 332/18 |
| 3,739,374 | 6/1973 | Kiowski | 235/197 |
| 3,740,670 | 6/1973 | Hoffman | 332/18 |
| 3,794,995 | 2/1974 | Thompson | 343/5 DP |
| 3,868,601 | 2/1975 | MacAfee | 325/38 R |

Primary Examiner—Charles D. Miller
Attorney, Agent, or Firm—Brown & Martin

[57] ABSTRACT

An amplitude modulator circuit that generates from digital values stored in a read only memory, envelope amplitude samples that are digitized in the ROM and are incremented out by an incrementing address counter that is clocked at a given clock rate to a digital to analog converter. The shape of the waveform envelope may be changed by selectively changing the clock rate. The modulator also has envelope correction means, wherein the amplified RF pulse envelope that may be distorted, is detected and fed back through an operational amplifier for changing the analog waveform shape modulated onto the RF signal.

6 Claims, 4 Drawing Figures

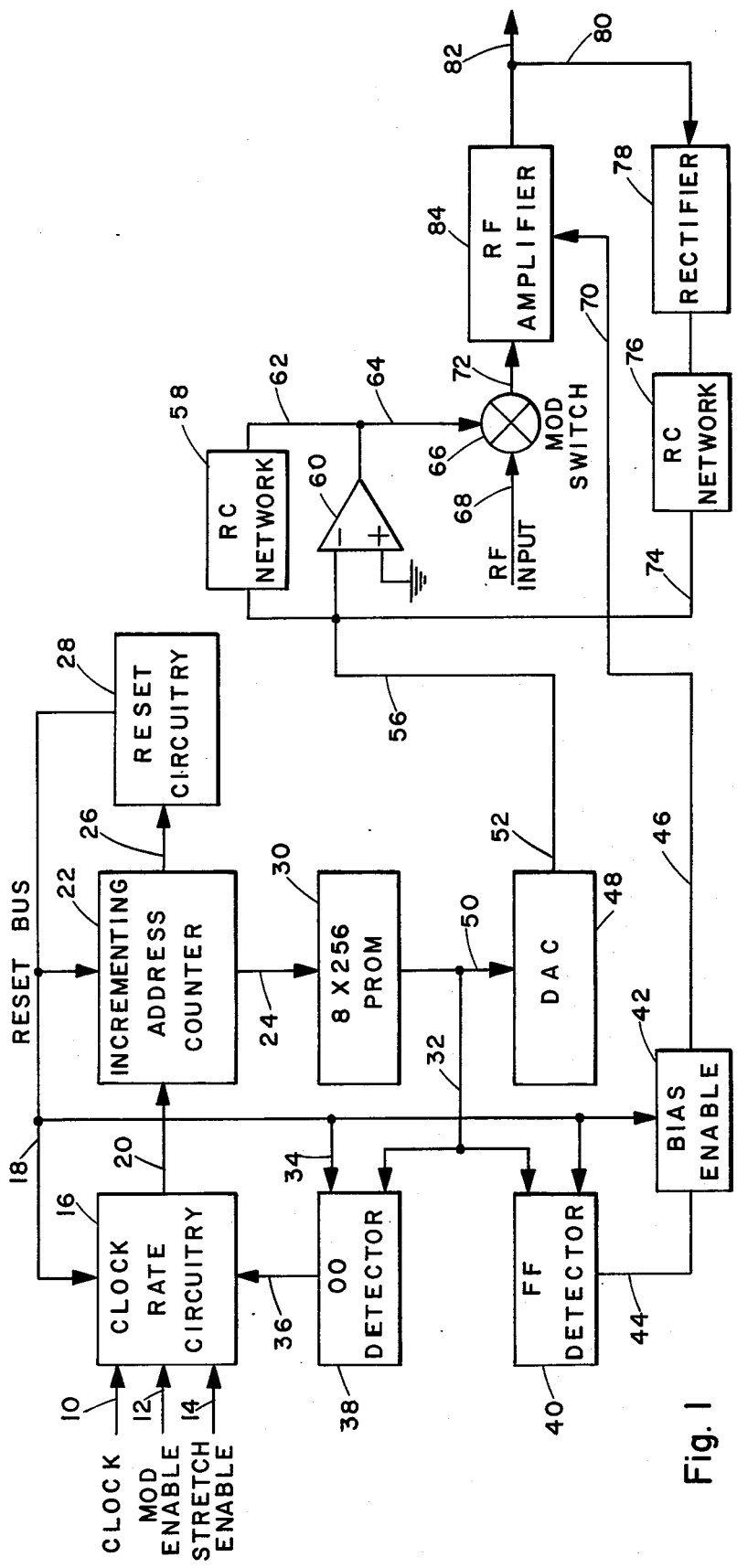
Fig. 1
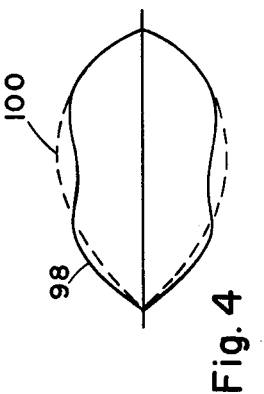
Fig. 4
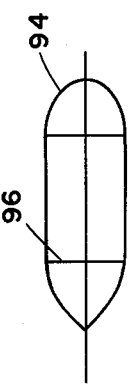
Fig. 3
Fig. 2

METHOD AND APPARATUS FOR DIGITALLY CONTROLLING AN AMPLITUDE MODULATED PULSE ENVELOPE ON AN RF SIGNAL

BACKGROUND OF THE INVENTION

There are many requirements for having a particular waveform shape or pulse envelope of an amplitude modulated RF signal. Such a pulse is particularly advantageously used where, for example, an amplitude modulated pulse on an RF carrier signal is being detected, and where it is desired to provide narrow band operation on one or two closely spaced frequencies. This can occur for example in distance ranging systems. Interference in a range measurement provides an error whose magnitude often depends on the severity of the interference. The pulse shape and its filtering can often be chosen to minimize this interference. However, such ranging systems usually employ high frequency signals and fast response times that greatly limit the use of particularly shaped pulse envelopes that can be generated in a reasonable manner, with relatively small, simple and light weight equipment. Such shaped envelopes are normally generated by built up L/C networks that can be complex, heavy and expensive.

Further in such systems, it is often desirable to be able to easily increase the length of the pulse to make it distinguishable from other pulses on a single carrier frequency system. Again this has to be accomplished in a simple, quick and yet accurate manner.

So it is advantageous to have an improved method and apparatus for digitally controlling the amplitude modulation of a pulse envelope on an RF signal.

SUMMARY OF THE INVENTION

In a preferred embodiment of this invention, a particular shaped waveform is generated from digital values stored in a digital memory, such as a read only memory. The particular values are addressed by an address counter, that is incremented by a clock signal. The output of the ROM is fed incrementally to a digital to analog converter, which analog output is then fed to an operational amplifier to an amplitude modulating switch in which the analog signal pulse modulates an RF signal.

The modulated RF signal is then amplified through an RF amplifier for transmission. However, the RF amplifier non-linearily often times changes the shape of the pulse waveform, thus defeating the obtaining of the desired envelope shape. Thus an envelope correction arrangement employs a feed back loop to the input of the operational amplifier, in a manner that the output waveform of the operational amplifier is sufficient to change the analog waveform to provide a correctioned waveform to the amplitude modulator that will achieve the desired shaped amplitude pulse envelope on the amplified RF signal.

It is therefore an advantage of this invention to provide a new and improved method and apparatus for digitally controlling the amplitude modulated pulse envelope on an RF signal.

Other objects and many advantages of this invention will become more apparent upon the reading of the following detailed description and an examination of the drawings, wherein like reference numerals designate like parts throughout and in which:

FIG. 1 is a block and schematic diagram of a circuit embodiment of the invention.

FIG. 2 is a diagram of the shape of a given pulse envelope.

FIG. 3 is a diagram of the given pulse envelope of FIG. 2, that is stretched out by changing the clock rate.

FIG. 4 is a diagram of the output waveform transmitted through the RF amplifier with the corrected signal in dotted lines superimposed thereon.

DESCRIPTION OF THE PREFERRED EMBODIMENT

Referring to FIG. 1, the transmitter modulator generates, on command, an amplitude pulse of a specified length and shape as illustrated in FIG. 2, that is used to modulate the RF signal in line 68. The circuit has a programmable read only memory 30, hereinafter referred to as PROM, in which the desired pulse shape or modulation envelope digital data is stored as bit weights at specific address locations. This is a known PROM circuit for storing bit weights. On command, the PROM 30 is caused to output the data stored to a digital to analog converter 48 (DAC), that converts the weighted data to an analog waveform that is fed to the RF amplifier 84 as a modulation envelope.

An incrementing address counter 22 provides 8 bit parallel binary addressing to the PROM 30 in the known manner at a specified clock rate, which is set by the state of the art clock rate circuitry 16.

In operation, the clock rate circuitry 16, upon recognizing a modulation enable command in line 12, outputs a frequency $f$ to the address counter 22 that begins to increment sequentially through the 256 address locations of the PROM 30. As each address location is recognized, contents of the particular ROM cell at the location provides an output to the DAC 48 that converts the output to an analog waveform. If no command except modulation enable is detected by the clock rate circuitry 16 that comprises known circuitry, the PROM 30 will continue to output all information stored in memory through address FF (256). When an address FF is initiated by the address counter 22, an end signal is fed through line 26 to the reset circuitry 28 which activates the reset circuit that resets the incrementing address counter 22, the clock rate circuitry 16, the 00 detector 38 which comprises a known circuit, the FF detector 40, and the bias enable 42. This returns the modulator to a steady state to receive another modulation enable command in line 12.

The output of the DAC 48 is fed through line 56 to the operational amplifier 60. The operational amplifier 60 feeds the output of the amplifier through line 64 to the amplitude modulator switch 66, that amplitude modulates the RF input signal in line 68 and feeds this modulated RF signal through RF amplifier 84 to the output line 82.

The operational amplifier 60 employs negative feedback to input line 56, through the feedback circuit line 62 and feedback network 58 which filters out the individual step integrations. Line 80, rectifier 78, network 76 and line 74 provide a feedback signal from the output line 82 to the input line 56 of the operational amplifier 60, that provides for correction of amplitude and frequency distortion of the modulation envelope caused by RF amplifier 84. In accomplishing this, amplifier 60 provides current to voltage conversion proportional to the current drawn by the DAC 48, which is a function of the weighted information output from the PROM 30. The voltage output from amplifier 60 enables the modulator switch 66, which passes the carrier in proportion to voltage. The output of the modulator switch 66 is amplified to the desired level by the RF amplifier 84. The modulation envelope correction is accomplished by sampling the output waveform in line 82 through line 80 and summing a correction signal of proper polarity into the DAC at the negative input of the amplifier 60. This changes the shape of the envelope from 98 to 100, as illustrated in FIG. 4.

If a stretch enable command is detected in line 14 by the clock rate circuitry 16 in coincidence with a signal in line 36, then the clock rate into the address counter 22 will change from $f$ to $f/8$ as information weighted 00, which is the center of the pulse in this embodiment, appears at the PROM 30 output, line 32. The slowing of the clock rate has the effect of stretching the analog pulse, providing the longer pulse of pulse 94 of FIG. 3. This condition will prevail until data other than all zeros at the PROM 30 output is detected, at which time the clock rate reverts to $f$. The address counter 22 continues to increment through the PROM 30 addresses until reaching the FF output and is reset. FF or all ones appears at the PROM 30 output at counter address location 00. This condition is detected by the FF detector 40 and disables the bias enable 42 to the transmitter amplifier bias circuitry. The bias circuitry is enabled for any PROM 30 output other than FF. When a 00 output of the PROM 30 is received by the detector 38, then it feeds a signal through line 36 which when there is an input signal on line 14, changes the clock rate circuitry to $f/8$.

Having described our invention, we now claim:

1. A circuit for digitally controlling the shape of an amplitude modulated pulse envelope on an RF signal comprising:
   read only memory means for storing digital values for increments of a given shaped amplitude waveform,
   clocking means including an incrementing address counter for accessing said read only memory in response to given clock pulses and clocking out the digital values at a given clock rate,
   means for converting said digital values incrementally into an analog waveform having the given shape,
   means for amplitude modulating an RF signal with the analog waveform,
   detector means responsive to a last sequence output of a series from the read only memory for providing a detector signal,
   clock rate means for decreasing the clock rate,
   and enable means responsive to the coincidence of an enable signal and the detector signal for enabling the clock rate means to decrease the clock rate of the clocking means in sequence with an output detector signal from the detector, thereby elongating the center shape of the pulse.

2. In a circuit as claimed in claim 1 in which,
   the converting means comprising a D to A converter,
   operational amplifier means for interfacing the output of said D to A converter to said modulator means,
   RF amplifier means for amplifying the output of said modulator means,
   and feedback means for feeding the pulse amplitude output of the RF amplifier back to the input of the operational amplifier for providing envelope shape correction to the pulse envelope.

3. In the circuit as claimed in claim 2 in which,
   said feedback means comprising a rectifier circuit for rectifying the RF amplifier output that is fed back to the operational amplifier.

4. In the circuit as claimed in claim 2 including,
   means responsive to said feedback means for selectively changing the analog waveform to provide an amplitude modulated signal envelope through the RF amplifier that has the given shape.

5. The method of digitally controlling the shape of an amplitude modulated pulse envelope on an RF signal comprising the steps of,
   storing digital values for increments of a given shaped amplitude waveform,
   using an incrementing address counter for accessing a read only memory in response to given clock pulses and clocking out the digital values at a given clock rate,
   converting the digital values incrementally into an analog waveform having the given shape,
   modulating an RF signal with the analog waveform,
   in response to a last sequence output of a series from the read only memory, providing a detector signal,
   and in response to a coincidence of an enable signal and the detector signal, decreasing the clock rate in sequence with an output detector signal to thereby elongate the center shape of the pulse while maintaining the same end shapes of the pulse.

6. The method as claimed in claim 5 including the steps of,
   using an operational amplifier to interface the output of a D to A converter to an amplitude modulator,
   amplifying the RF output of the modulator,
   and feeding the amplified pulse amplitude output back to the input of the operational amplifier providing envelope shape correction to the pulse envelope.

* * * * *